United States Patent [19]

Mu et al.

[11] Patent Number: 5,991,296
[45] Date of Patent: *Nov. 23, 1999

[54] CROSSBAR SWITCH AND METHOD WITH REDUCED VOLTAGE SWING AND NO INTERNAL BLOCKING DATA PATH

[75] Inventors: Albert Mu, Milpitas; Jeffrey D. Larson, San Jose, both of Calif.

[73] Assignee: Fujitsu, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,920

[22] Filed: Feb. 22, 1996

[51] Int. Cl.$^6$ ............................................. H04Q 3/52
[52] U.S. Cl. ................. 370/380; 370/416; 340/825.85
[58] Field of Search ................................. 370/380, 381, 370/352, 395, 412–416; 340/825.85, 825.9, 825.93, 825.89, 825.95; 365/208

[56] References Cited

U.S. PATENT DOCUMENTS

| Re. 35,483 | 3/1997  | Harrand      | 340/825.9  |
|------------|---------|--------------|------------|
| 4,058,838  | 11/1977 | Crager et al.| 358/257    |
| 4,412,380  | 11/1983 | Matsuda et al.| 340/825   |
| 4,434,381  | 2/1984  | Stewart      | 307/279    |
| 4,868,813  | 9/1989  | Suzuki       | 370/160    |
| 4,894,651  | 1/1990  | Trumpp et al.| 340/825.91 |
| 4,963,863  | 10/1990 | Hofmann      | 340/825.91 |
| 5,079,762  | 1/1992  | Tanabe       | 370/60     |

(List continued on next page.)

FOREIGN PATENT DOCUMENTS

| 0 378 401 A2 | 7/1990  | European Pat. Off. . |
| 0 380 856 A2 | 8/1990  | European Pat. Off. . |
| 0 404 423 A2 | 12/1990 | European Pat. Off. . |
| 0 405 990 A2 | 1/1991  | European Pat. Off. . |
| 0 588 745 A1 | 3/1994  | European Pat. Off. . |
| 0 602 693 A2 | 6/1994  | European Pat. Off. . |
| 2 032 736    | 5/1980  | United Kingdom .     |
| WO 91/07032  | 5/1991  | WIPO .               |

OTHER PUBLICATIONS

"Hybrid Switch For A Highly Parallel Message Passing System", IBM Technical Disclosure Bulletin vol.33. No. 1A. pp. 214–217. Jun. 1. 1990.

"A Low Power Generator Based FIFO Using Ring Pointers And Current Mode Sensing". IEEE International Solid State Circuits Conference. Fenstermaker et al. vol. 36. XP000388092. pp. 242–243 & 295. New York. Feb. 1993.

*Primary Examiner*—Chau Nguyen
*Attorney, Agent, or Firm*—Fenwick & West LLP

[57] ABSTRACT

A switch system and method transfer a data packet from a source data port to one or more destination data ports through a switch. The system comprises a source input buffer, a first and a second source input path, a first and a second output path and at least one crosspoint circuit. The source input buffer includes a first and a second data section. The first and the second data sections are coupled to the first and the second input paths respectively. The first and the second input paths couple through the crosspoint circuits at each intersection with the first and the second output paths. The method includes loading the data packets into data sections of an input buffer, transferring each data packet across an input path dedicated for each data section, transmitting each data packet over its input path, and switching the data from the input path to the output path based on a voltage differential. A crosspoint circuit in the switch system includes a first and a second reduced voltage swing line, a first and a second transistor circuit for each data input path and a sense amplifier for a data port. The first reduced voltage swing line is coupled to the first transistor circuit, the second reduced voltage swing line is coupled to the second transistor circuit and both reduced voltage swing lines are connected to the sense amplifier. The method of the unit comprises the steps of charging a first and a second reduced voltage swing line to a predetermined voltage, discharging the voltage from the first reduced voltage swing line, maintaining the voltage in the second voltage line, receiving a clock signal at the sense amplifier, and generating an output signal based on a voltage differential between the voltage lines.

8 Claims, 10 Drawing Sheets

U.S. PATENT DOCUMENTS

| | | | |
|---|---|---|---|
| 5,140,582 | 8/1992 | Tsuboi et al. | 370/60 |
| 5,166,926 | 11/1992 | Cisneros et al. | 371/60 |
| 5,226,014 | 7/1993 | McManus | 365/210 |
| 5,241,536 | 8/1993 | Grimble et al. | 370/60.1 |
| 5,255,265 | 10/1993 | Eng et al. | 370/60 |
| 5,267,235 | 11/1993 | Thacker | 370/60 |
| 5,285,445 | 2/1994 | Lehnert et al. | 370/60 |
| 5,327,127 | 7/1994 | May et al. | 341/102 |
| 5,345,228 | 9/1994 | Franaszek et al. | 370/380 |
| 5,406,554 | 4/1995 | Parry | 370/58.1 |
| 5,406,563 | 4/1995 | Loebig | 371/5.1 |
| 5,473,755 | 12/1995 | Dunning | 395/250 |
| 5,491,667 | 2/1996 | Sharp | 365/205 |
| 5,493,566 | 2/1996 | Ljungberg et al. | 370/413 |
| 5,502,680 | 3/1996 | Du et al. | 365/205 |
| 5,508,644 | 4/1996 | Branson et al. | 327/57 |
| 5,517,495 | 5/1996 | Lund et al. | 370/399 |
| 5,524,112 | 6/1996 | Azuma et al. | 370/402 |
| 5,541,919 | 7/1996 | Yong et al. | 370/61 |
| 5,544,161 | 8/1996 | Bigham et al. | 370/58.1 |
| 5,555,264 | 9/1996 | Sallberg et al. | 370/17 |
| 5,600,637 | 2/1997 | Kikuta | 370/389 |
| 5,613,067 | 3/1997 | Brady et al. | 395/200.13 |
| 5,619,497 | 4/1997 | Gallagher et al. | 370/394 |
| 5,689,500 | 11/1997 | Chiussi et al. | 370/235 |

CROSSBAR SWITCH AND METHOD WITH REDUCED VOLTAGE SWING AND NO INTERNAL BLOCKING DATA PATH

CROSS-REFERENCES TO RELATED APPLICATIONS

The subject matter of this application is related to the subject matter of the following applications:

application Ser. No. 08/605,677, entitled "ASYNCHRONOUS PACKET SWITCHING" filed on Feb. 22, 1996, by Thomas M. Wicki, Patrick J. Helland, Takeshi Shimizu, Wolf-Dietrich Weber, and Winfried W. Wilcke;

application Ser. No. 08/605,676, now U.S. Pat. No. 5,740, 346, entitled "SYSTEM AND METHOD FOR DYNAMIC NETWORK TOPOLOGY EXPLORATION" filed on Feb. 22, 1996, by Thomas M. Wicki, Patrick J. Helland, Wolf-Dietrich Weber, and Winfried W. Wilcke;

application Ser. No. 08/603,926, now U.S. Pat. No. 5,838, 684, entitled "LOW LATENCY, HIGH CLOCK FREQUENCY PLESIOASYNCHRONOUS PACKET-BASED CROSSBAR SWITCHING CHIP SYSTEM AND METHOD" filed on Feb. 22, 1996, by Thomas M. Wicki, Jeffrey D. Larson, Albert Mu, and Raghu Sastry;

application Ser. No. 08/603,880, now U.S. Pat. No. 5,892, 766, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki;

application Ser. No. 08/603,913, entitled "A FLOW CONTROL PROTOCOL SYSTEM AND METHOD" filed on Feb. 22, 1996, by Thomas M. Wicki, Patrick J. Helland, Jeffrey D. Larson, Albert Mu, and Raghu Sastry; and Richard L. Schober, Jr.;

application Ser. No. 08/603,911, now U.S. Pat. No. 5,768, 300, entitled "INTERCONNECT FAULT DETECTION AND LOCALIZATION METHOD AND APPARATUS" filed on Feb. 22, 1996, by Raghu Sastry, Jeffrey D. Larson, Albert Mu, John R. Slice, Richard L. Schober, Jr. and Thomas M. Wicki;

application Ser. No. 08/603,923, entitled, "METHOD AND APPARATUS FOR DETECTION OF ERRORS IN MULTIPLE-WORD COMMUNICATIONS" filed on Feb. 22, 1996, by Thomas M. Wicki, Patrick J. Helland and Takeshi Shimizu;

application Ser. No. 08/603,882, now U.S. Pat. No. 5,615, 161, entitled "CLOCKED SENSE AMPLIFiER WITH POSITIVE SOURCE FEEDBACK" filed on Feb. 22, 1996, by Albert Mu;

all of the above applications are incorporated herein by reference in their entirety.

BACKGROUND OF THE INVENTION

1. Field of the Invention

This invention generally relates to the field of electronic routing systems, and in particular, to a switch system and method for routing data packets between data ports.

2. Description of the Related Art

A crossbar switch system is a relay operated device or the equivalent that makes a connection between a one-bit signal line in one set of signal lines and a one-bit signal line in another set of signal lines that are essentially orthogonally oriented relative to the signal lines in the one set. In a typical chip, a crossbar switch is used to route data from one data port to another data port. Traditional cell-based, full logic swing crossbar switches involved many switching elements that caused long time delays and high power consumption due to the capacitance of the switching elements and the resistance and capacitance of the metal. Generally, conventional systems routed data by moving the data to be transmitted from a transmitting data port to an input buffer associated with that data port, along a single data line, to an input of a crossbar switch, to an intersection at which a second data line that is also connected to the crossbar switch connects, to an output of the crossbar switch, and to the receiving data port.

In a typical conventional system, a crossbar switch system has six bi-directional data lines, so that there is only one data line for each data port that is numbered for simplicity 1 through 6. Each data port has a data buffer and each data buffer includes block units that each hold a portion of a packet of data. Typically, there are six to eight block units in each data buffer. Each data buffer is coupled to the data line associated with that particular data port. Within the crossbar switch, each data line is coupled to each other data line at an intersection point. Typically, data lines 1, 2, and 3 are positioned horizontally, while data lines 4, 5, and 6 are positioned vertically, so that the lines form a grid or orthogonally oriented data lines. Where two lines intersect and couple together is an intersection point for connecting two data ports.

When the conventional system is operational, a data port loads its associated buffer with the packets of data it seeks to transmit, along with information on the priority of the data in the blocks and on which output port to transmit the data. An arbitration process is also employed to determine the order in which the block units are to transmit over the data line to the crossbar switch. Furthermore, a second arbitration process at the output end determines whether the destination data port is available to receive the data from the data blocks. In conventional systems the arbitration processes occur to provide a priority of transmission. Once a block of data successfully gets access to both the transmitting data line and the receiving data line, the data is transmitted to the crossbar switch and to the destination data port by switching from the transmitting line to the receiving line at the intersection point where the two lines couple together. Similarly, another data port may undertake a similar operation to transmit data from its buffer, along its data lizne to the crossbar switch, to the intersection point where the data line coupled to the destination port couples to the transmitting data line, and out to the destination data port.

The following examples illustrate operation of the conventional systems. As a first example, the data port 1 seeks to transmit its data packets to the data port 6. The data port 1 loads the data packets into the blocks, for example 8 data packets into 8 blocks, of the data port 1 buffer. Each data packet in the data port 1 buffer also includes priority information such as low, medium, or high, as well as address information to direct transmission of the data to the data port 6. The system begins using a first arbitration process to determine the order of transmitting the data packets in the blocks across data line 1 to the crossbar switch. A second arbitration process then determines whether the data port 6 is available to receive the data packets. Once these arbitration processes are completed and a data block is given access to both the data line 1 and the data line 6, the data packet from that data block is transmitted across the data line 1 into the crossbar switch, to the intersection point where the data line 1 couples with the data line 6, onto the data line 6 and out to the data port 6. The problem with this approach is that two arbitration processes decrease system performance as system time and resources are consumed to arrange and order the data packets before transmission begins. Moreover, in the conventional systems, internal blocking is not prevented. Internal blocking is a typical problem in conventional systems where a data packet destined for a particular data port is unable to transmit to that data port because of a transmission of another data packet to that data port.

As a second example, both the data port 1 and the data port 3 seek to transmit their respective data packets to the data port 6. In this implementation, each source data port undergoes a first arbitration process to determine the order to transmit the data packets in the data blocks of their own data buffer across their data line and to the crossbar switch. A second arbitration process is also applied to determine whether the data port 6 is available to receive the data packets, and if so, from where it may receive the data packets, that is either from the data port 1 buffer or the data port 3 buffer. After the two arbitration processes are completed, the data block that won both arbitration processes begins transmitting through its data line, to the crossbar switch, to the data line 6 and onto the data port 6. All other data packets in the data blocks of the data port 1 and the data port 3 must wait to transmit. Once again, the problem with this approach is that the two arbitration processes require significant system time and resources resulting in decreased overall system performance for routing data.

As a third example of a crossbar switch system, the data port 1 seeks to transmit a data packet to the data port 6. In this example, the data port 1 has already undergone the first arbitration process and begins transmission of the data packets from its data input buffer to the data port 6. Subsequently, the data port 3 seeks to transmit its data packets from the data blocks of its data input buffer, with the data packets from some blocks destined for the data port 6 and the data packets from other blocks destined for the data port 5. Moreover, the data blocks holding the data packets to be transmitted to the data port 6 are designated high priority while the data blocks holding the data packets to be transmitted to the data port 5 are designated medium priority.

During the first arbitration process for the data port 3 data packet, the data packets in the data blocks destined for the data port 6 are ordered in terms of their priority for transmission across the data line 3. However, the second arbitration process will not permit transmission to the data port 6 because the data port 6 is unable to receive a data transmission as it is busy receiving data from the data port 1. Moreover, the data in the data blocks destined for the data port 5 are also unable to transmit because it lost the first arbitration process to the high priority blocks that are waiting to transmit across the data line 6 and onto the data port 6. The data packets in the data blocks destined for the data port 6 have been given priority and control of the data line 3, by virtue of prevailing in the first arbitration process, until its transmission is completed. This problem described and associated with the conventional systems is another example of internal blocking. Internal blocking also occurs where multiple data packets having the same priority reside in the same data input buffer. Internal blocking decreases system performance because of the greater time required to transmit the data packets when a higher priority data block is unable to transmit forcing lower priority data blocks to remain idle and wait until the higher priority data block completes its transmission.

Another problem associated with conventional crossbar switch systems involves using a full-swing operational implementation to switch logic states. A drop voltage level necessary to trigger the switch cannot be reached. For example, if the voltage required to switch a state is 2.5 volts ("V") for ON and 0.8 V for OFF and the system voltage level only reaches 2.3 V, a switch may not switch ON. The problem with the prior art systems is that longer clock cycle times are required as the system must wait to switch states until the voltage level can rise back to 2.5 volts. Moreover, the full-swing bus implementation of the prior art systems results in greater power dissipation on the chip. Thus, there is a decrease in the performance and power ratio on the chip.

Therefore, there is a need for a crossbar switch system that provides faster and more efficient data throughput thereby increasing overall switch system performance. There is also a need for a switch data bus that allows for faster and more efficient switching despite being heavily loaded and being wired with resistive interconnect.

SUMMARY OF THE INVENTION

Generally, the present invention relates to a switch system within a routing device that is designed to route data from one data port to another data port through the use of a crossbar switch. The present invention is designed to increase the data throughput of a crossbar switch system by coupling multiple input data buses, or paths, from a source data port to a reduced-swing differential output data bus, or path, in the crossbar switch to produce the data at a destination data port coupled to the output data bus.

The system and method of the present invention satisfies the need for faster and more efficient data throughput in a switching system to improve overall system performance. The system of the present invention comprises a source data port input buffer, a first source data input path, a second source data input path, a first data output path, a second data output path, and at least one crosspoint circuit. The source data port input buffer further comprises a first data section and a second data section. Each crosspoint circuit is a differential, reduced voltage swing circuit.

The first data section of the source data port input buffer is coupled to the first data input path and the second data section of the source data port input buffer is coupled to the second data input path. The first and the second data input paths each couple to the first data output path and the second data output path through the crosspoint circuit located at each intersection of the input paths and the output paths. The system of the present invention has the advantage of transferring data in each data section simultaneously to different data output paths, without delaying transmission due to an initial arbitration process for transferring across a singular data input path, an internal blocking problem, or an overloaded bus. Therefore, the present invention significantly increases data throughput in the system.

The method of the present invention comprises the steps of loading each of a data packets or frames into data sections of an input buffer, coupling an input path for each data section to a switch, transmitting each data packet to the switch from the data section through the coupled input path, and switching each data packet from the input path to an output path. The method of the claimed invention allows for transferring multiple data packets from the input buffer to a switch simultaneously and then forwarding the data packets to one or more destination data ports. Therefore, the method of the claimed invention improves overall system performance by increasing the rate and efficiency of data throughput in the system.

The system and method of the present invention includes a differential, reduced voltage swing circuit crosspoint circuit for a switch system. The crosspoint circuit comprises a first reduced voltage swing line and a second reduced voltage swing line, along with a first transistor circuit and a second transistor circuit for each data input path and a sense amplifier for a data port. The first reduced voltage swing line is coupled to the first transistor circuit and the sense amplifier. The second reduced voltage swing line is coupled to the second transistor circuit and the sense amplifier. The sense amplifier produces an output signal for the data port. The crosspoint circuit has the advantage of coupling multiple data input paths on a bus within a switch without decreasing system performance because of overloading the bus. Also, the crosspoint circuit allows for changes in a state of a data signal based on a clock signal and a voltage differential rather than a particular voltage level, thereby increasing system performance because immunity from common mode noise allows lower voltage swings to be used. In addition, on-chip power dissipation is reduced because the voltage swing on the bus is reduced.

The method of operation of the crosspoint circuit comprises the steps of charging a first voltage line and a second voltage line to a preset voltage level, discharging the preset voltage level from the first voltage line, maintaining the preset voltage level in the second voltage line, receiving a clock signal at the sense amplifier to place the sense amplifier in an on state, triggering the sense amplifier based on the voltage differential in the first voltage line and the second voltage line, and outputting a full-swing output signal from the sense amplifier. The method of operation of the crosspoint circuit provides the benefit of changing output states based on a differential voltage measurement rather than a voltage level measurement. The advantage of this approach is to increase overall system performance because the common mode rejection allows a lower voltage signal swing to be used. In addition, because the method has an excellent common mode noise rejection, full-swing output signals can be generated.

These and other features, aspects, and advantages of the present invention will become better understood with regard to the following description, appended claims, and accompanying drawings.

DETAILED DESCRIPTION OF THE PREFERRED EMBODIMENT

Figure 1:
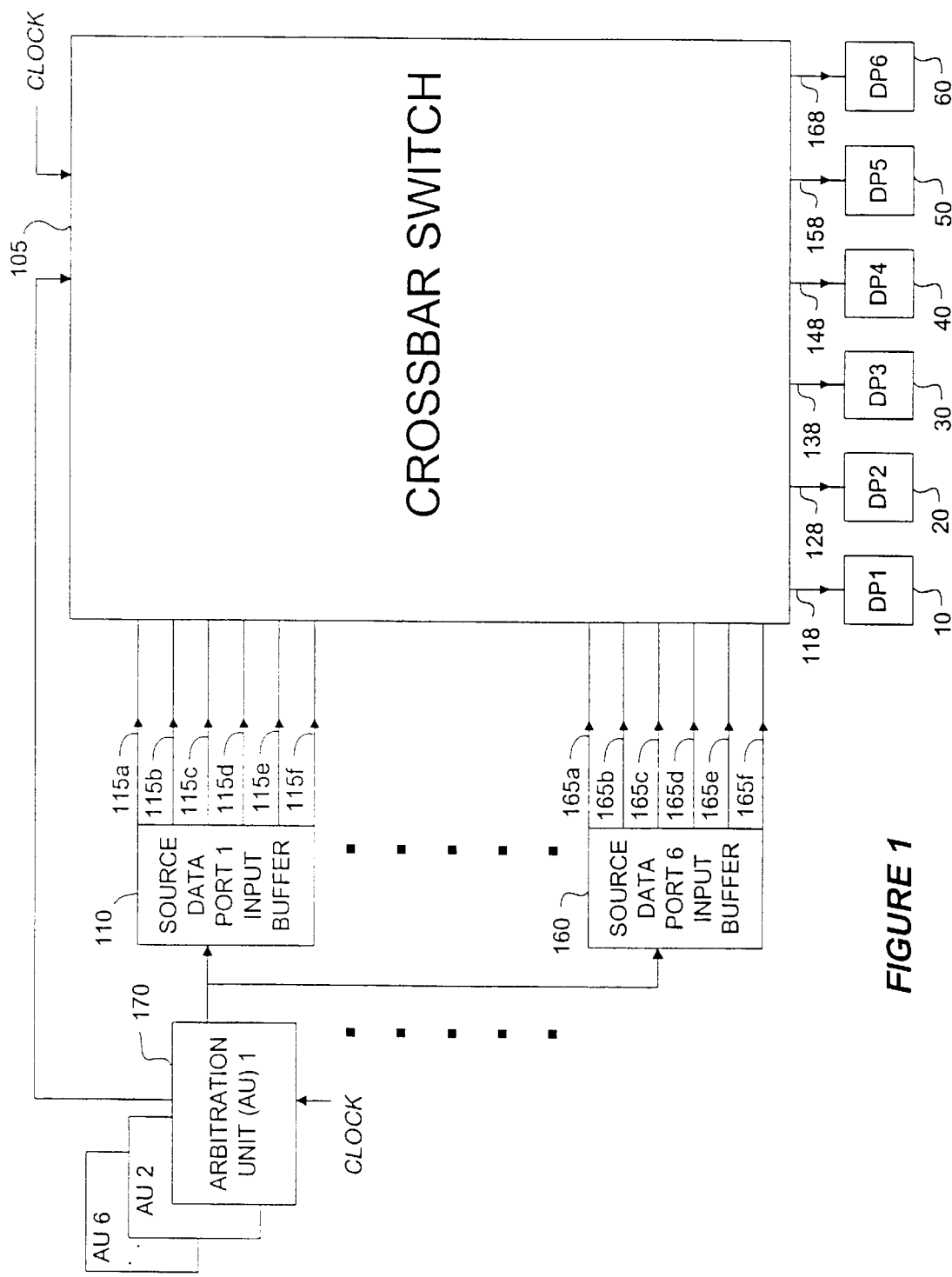
FIG. 1 is a block diagram illustrating one embodiment of a crossbar switch system in the present invention.

Referring now to FIG. 1, the block diagram illustrates one embodiment of a crossbar switch switching system of the present invention that comprises a crossbar switch 105, source data port input buffers 110, 120, 130, 140, 150, 160, a corresponding set of data input paths 115a–f, 125a–f, 135a–f, 145a–f, 155a–f, 165a–f, data output paths 118, 128, 138, 148, 158, 168, destination data ports 10, 20, 30, 40, 50, 60, and an arbitration unit 170 for each data port 10, 20, 30, 40, 50, 60 (for a total of six (6) arbitration units). The data port input buffers 2 through 5 120, 130, 140, 150 and their associated data input paths 125a–f, 135a–f, 145a–f, 155a–f are not shown, but should be understood to be structurally equivalent to the source data port 1 input buffer 110 and the source data port 6 input buffer 160 and their respective data input paths 115a–f, 165a–f. Moreover, although not shown, it should also be understood that the source data port 1 is coupled to the source data port 1 input buffer 110 and the data output path 118, the source data port 2 is coupled to the source data port 2 input buffer 120 and the data output path 128, the source data port 3 is coupled to the source data port 3 input buffer 130 and the data output path 138, the source data port 4 is coupled to the source data port 4 input buffer 140 and data output path 148, the source data port 5 is coupled to the source data port 5 input buffer 150 and the data output path 158, and the source data port 6 is coupled to the source data port 6 input buffer 160 and the data output path 168. In the present invention, each data port may be a router device, a network device, a computer device, a peripheral device, or the like.

Each source data port input buffer 110, 120, 130, 140, 150, 160 is coupled to the corresponding set of data input paths 115a–f, 125a–f, 135a–f, 145a–f, 155a–f, 165a–f. Each set of data input paths 115a–f, 125a–f, 135a–f, 145a–f, 155a–f, 165a–f is coupled to the crossbar switch 105 at an associated input for each data input path. The data output paths 118, 128, 138, 148, 158, 168 are also coupled to the crossbar switch 105. Each data output path 118, 128, 138, 148, 158, 168 is also coupled to its respective destination data port 10, 20, 30, 40, 50, 60. For each destination data port 10, 20, 30, 40, 50, 60, the associated arbitration unit 170 is coupled to each source data port input buffer 115, 125, 135, 145, 155, 165 and the crossbar switch 105. Both the crossbar switch 105 and the arbitration unit 170 include a clock signal input.

Operation of the system generally involves moving data from a source data port, to one or more destination data ports. For example, when source data port 1 seeks to transmit to destination data port 6 60, the source data port 1 input buffer 110 is first loaded with data packets or frames that are to be transmitted. A data frame comprises a data packet that may include other bit information such as address or priority information, as is discussed below. The each data packet is loaded into its own data section of the source data input buffer 110 and transmitted across the data input path associated with the each data section. Next, the associated arbitration unit 170 determines whether the destination data port 6 60 is available to receive data. Once the destination data port 6 60 is available, the arbitration unit enables a crosspoint circuit 210 to electrically couple the data input path and the data output path so that the data packets are switched, or routed, to the destination data port 6 output path 168 that is coupled to destination data port 6 60.

In an alternative embodiment of the present invention, there may be more or less than six source or destination data ports, source data port input buffers, and data output paths. There may also be more or less than six data sections and six data input paths from each data port input buffer to a crossbar switch.

Figure 2:
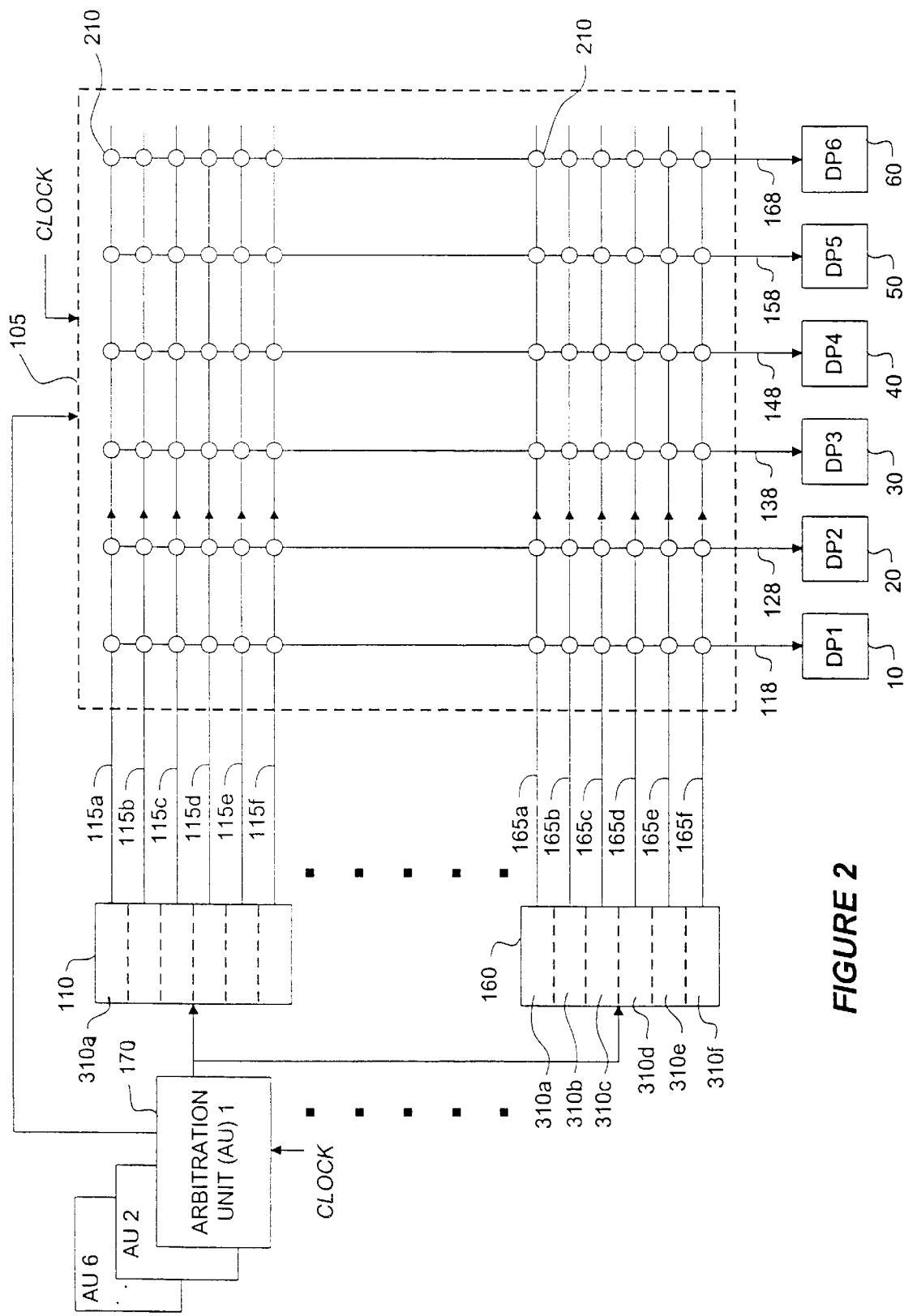
FIG. 2 is a block diagram illustrating one embodiment of an internal structure of the present invention having a set of data input paths and set of data output paths coupled through a crosspoint circuit in a crossbar switch.

Referring now to FIG. 2, a block diagram illustrates one embodiment of internal circuitry of the crossbar switch 105. The block diagram shows a crosspoint matrix comprising horizontal and vertical buses that are coupled together at each intersection by a crosspoint circuit 210. The data input paths 115a–f, 125a–f, 135a–f, 145a–f, 155a–f, 165a–f comprise the horizontal buses and the data output paths 118, 128, 138, 148, 158, 168 comprise the vertical buses. Also, the system includes the destination data ports 10, 20, 30, 40, 50, 60 and each destination data port 10, 20, 30, 40, 50, 60 has an associated arbitration unit 170.

Each data input path 15a–f, 125a–f, 135a–f, 145a–f, 155a–f, 165a–f is coupled to a data section 310a–f of each source data port input buffer 110, 120, 130, 140, 150, 160 to provide dedicated access to the crossbar switch 105. In addition, each data input path 115a–f, 125a–f, 135a–f, 145a–f, 155a–f, 165a–f electrically couples to each data output path 118, 128, 138, 148, 158, 168 through a crosspoint circuit 210 at an intersection where any two paths cross. Thus, in one embodiment of the present invention there are 6 source data port input buffers, each having 6 data sections, 36 data input paths, 6 data output paths, and 216 crosspoint circuits (36 crosspoint circuits along each data output path) within the crossbar switch 105. In addition, each arbitration unit 170 associated with each destination data port is coupled to each source data port input buffer 110, 120, 130, 140, 150, 160 and the crossbar switch 105.

The arbitration unit 170 includes arbitration logic to generate a grant signal that is combined with a clock signal to provide an enable signal for the crosspoint circuit 210, as described below with respect to FIG. 6. One embodiment of the arbitration unit 170 is further described in the above-referenced U.S. patent application, Ser. No. 08/603,880, titled "METHOD AND APPARATUS FOR COORDINATING ACCESS TO AN OUTPUT OF A ROUTING DEVICE IN A PACKET SWITCHING NETWORK", filed on Feb. 22, 1996, by Jeffrey D. Larson, Albert Mu, and Thomas M. Wicki. In addition, each data input path 115a–f, 125a–f, 135a–f, 145a–f, 155a–f, 165a–f, and each data output path 118, 128, 138, 148, 158, 168 is a 70-bit data path. In alternative embodiments, the bit width of each data path may be more or less than 70 bits. Moreover, each data path may include a 10 millimeter ("mm") long conduction element.

One advantage of providing the dedicated input path 115a–f, 125a–f, 135a–f, 145a–f, 155a–f, 165a–f from each data section of each input buffer 110, 120, 130, 140, 150, 160 to the crossbar switch 105 according to the present invention is the elimination of an arbitration for obtaining access to the crossbar switch through a single non-dedicated input path, thereby increasing data throughput within the system. Another advantage of the present invention is the elimination of internal blocking, as is further described below, thereby also increasing data throughput within the system.

Figure 3:
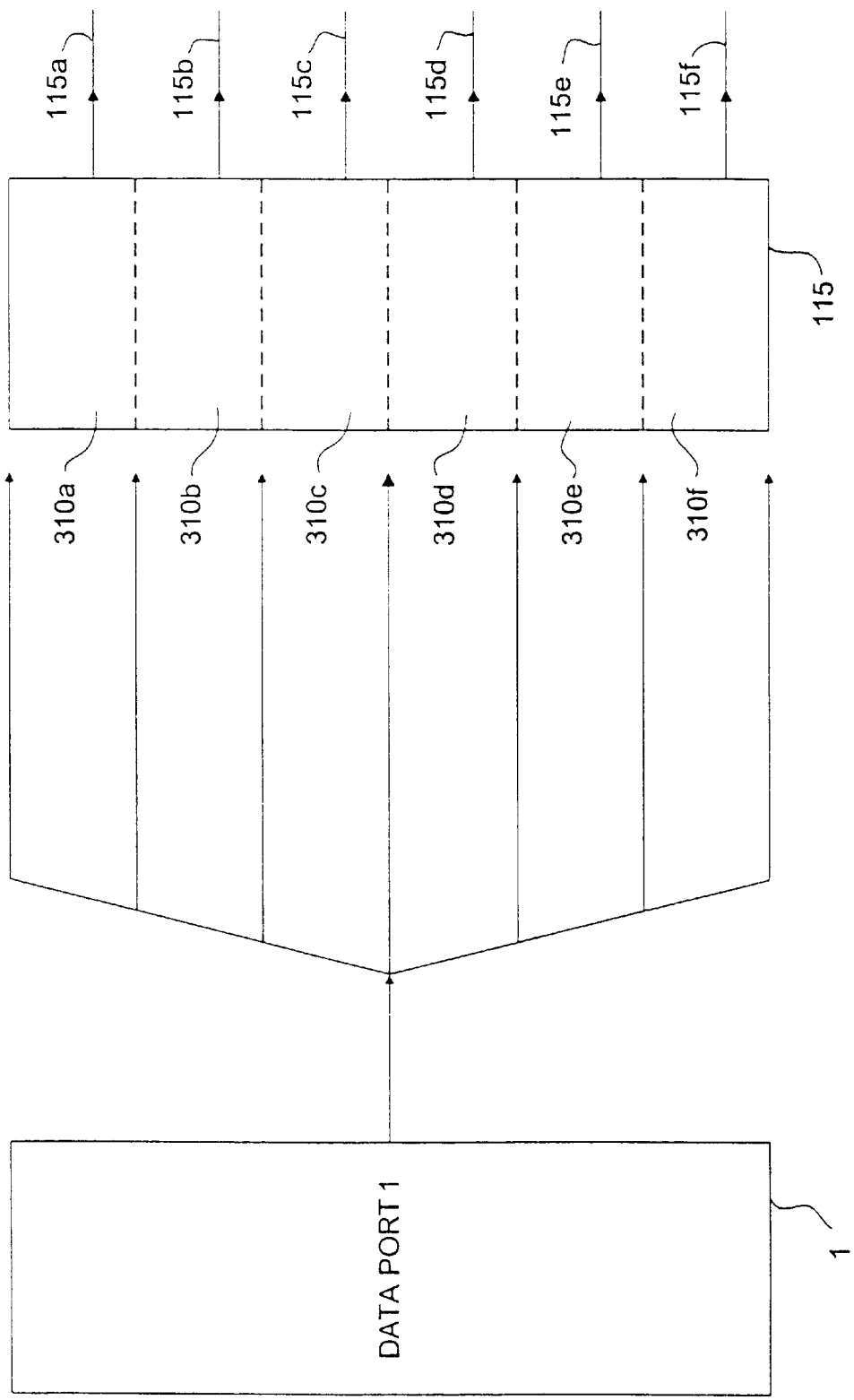
FIG. 3 is a block diagram illustrating one embodiment of data packets or frames loaded into a source data port input buffer.

FIG. 3 illustrates one embodiment of a source data port loading a data packet into a source data port input buffer. For purposes of simplicity, the figure is described with respect to the source data port 1 input buffer 110, but the general principles discussed should be understood to apply to the remaining source data port input buffers 120, 130, 140, 150, 160. This embodiment includes the source data port 1, the source data port 1 input buffer 110 having six data sections 310a–f, and six data port 1 input paths 115a–f. Each data section 310a–f is coupled to its own, respective data input path 1151–f. Generally, each data packet is loaded into its own data section 3101–f. Also, associated with each data packet is a header that provides priority and destination address information for that particular data packet. The data packet with the associated address and priority information may be referred to as the data frame. Each data packet may be destined for the same destination data port, or to different destination data ports. In alternative embodiments of the present invention, there may be a fewer or a greater number of data sections in an input buffer.

Figure 4:
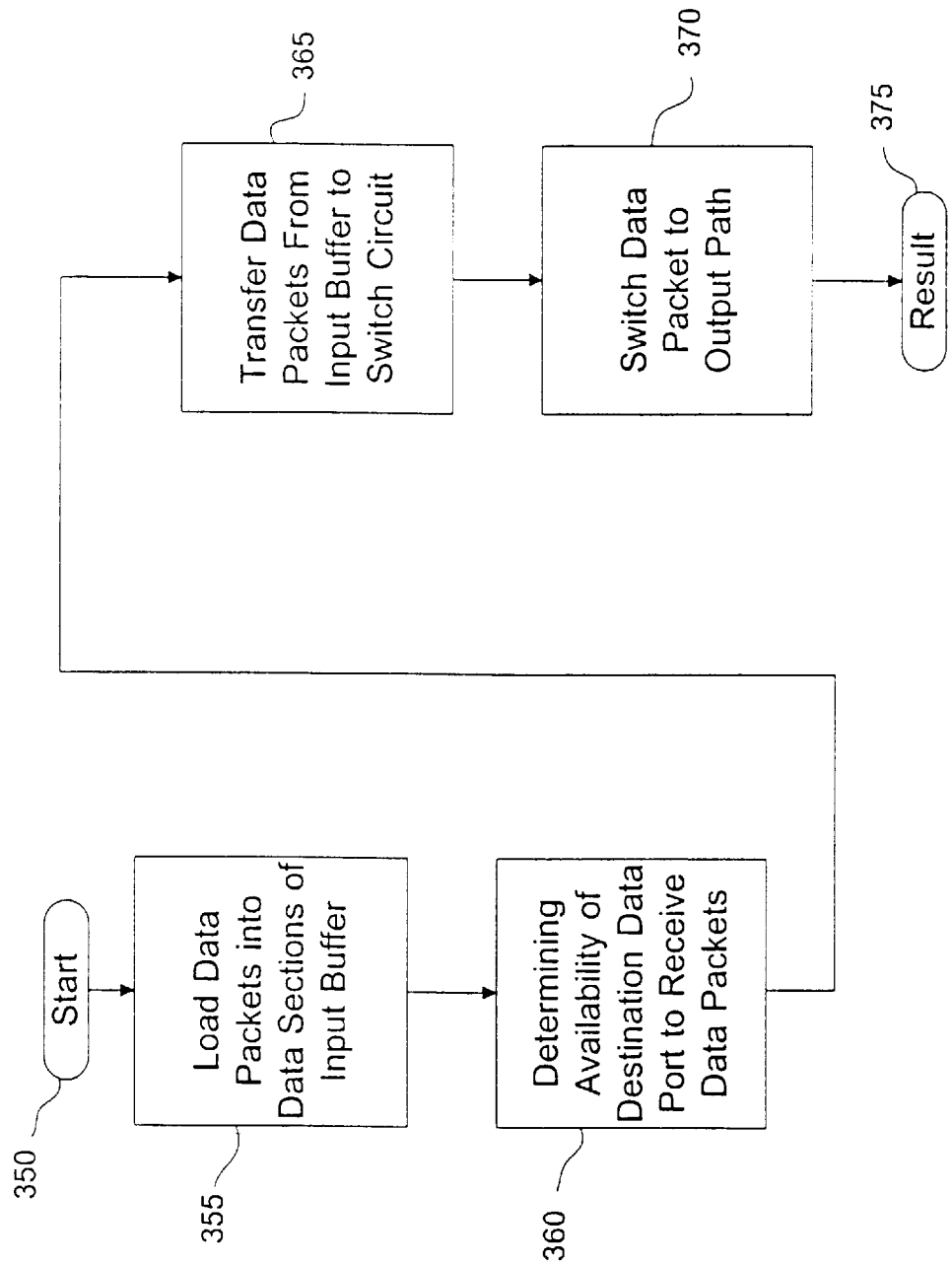
FIG. 4 is a flow diagram illustrating one method of operation of one embodiment of the present invention.

Referring now to FIG. 4, a flow diagram illustrates a general method of operation of one embodiment of the present invention using as an example transmission of data packets from the source data port 1 to the destination data port 6 60. When the system starts 350 and the data packets are to be transmitted to the destination data port 6 60, the each data packet is loaded 355 into its own data section 310a–f of the source data port 1 input buffer 110. Each data packet also includes a header that provides destination information indicating transmission to the destination data port 6 60 as well as priority information indicating the level of priority associated with each data packet. After the data packets are loaded 355 into the appropriate data sections 310a–f, the system determines 360, through an arbitration process, whether the destination data port 6 is available to receive the data. Once the destination data port 6 60 is available, the system transfers 365 the data packet in each data section 310a–f to the crossbar switch 105. Each data packet is transferred 365 from its respective data section 310a–f across its own dedicated data port 1 input path 115a–f that is coupled to the respective data section 3101–f. The data packet is then switched, or routed, 370 from the data port 1 input paths 115a–f to the data port 6 output path 168 and sent onto the destination data port 6 60. Because each data section has its own data path, the system does not require a separate arbitration process to transmit from the data input buffer 110 to the crossbar switch 105.

The present invention demonstrates a benefit of each data packet and respective data section having its own dedicated input path directly coupled to the crossbar switch 105. One advantage of this implementation is having one arbitration process rather than two arbitration processes so that contention to gain access to the crossbar switch 105 is eliminated and the system now completes the arbitration process in one clock cycle. By eliminating the time and the system resources that were previously necessary for two arbitrations to transmit data packets across a single data port 1 input path to the crossbar switch 105, the speed of data signal transmission in the system is vastly improved.

Figure 5:
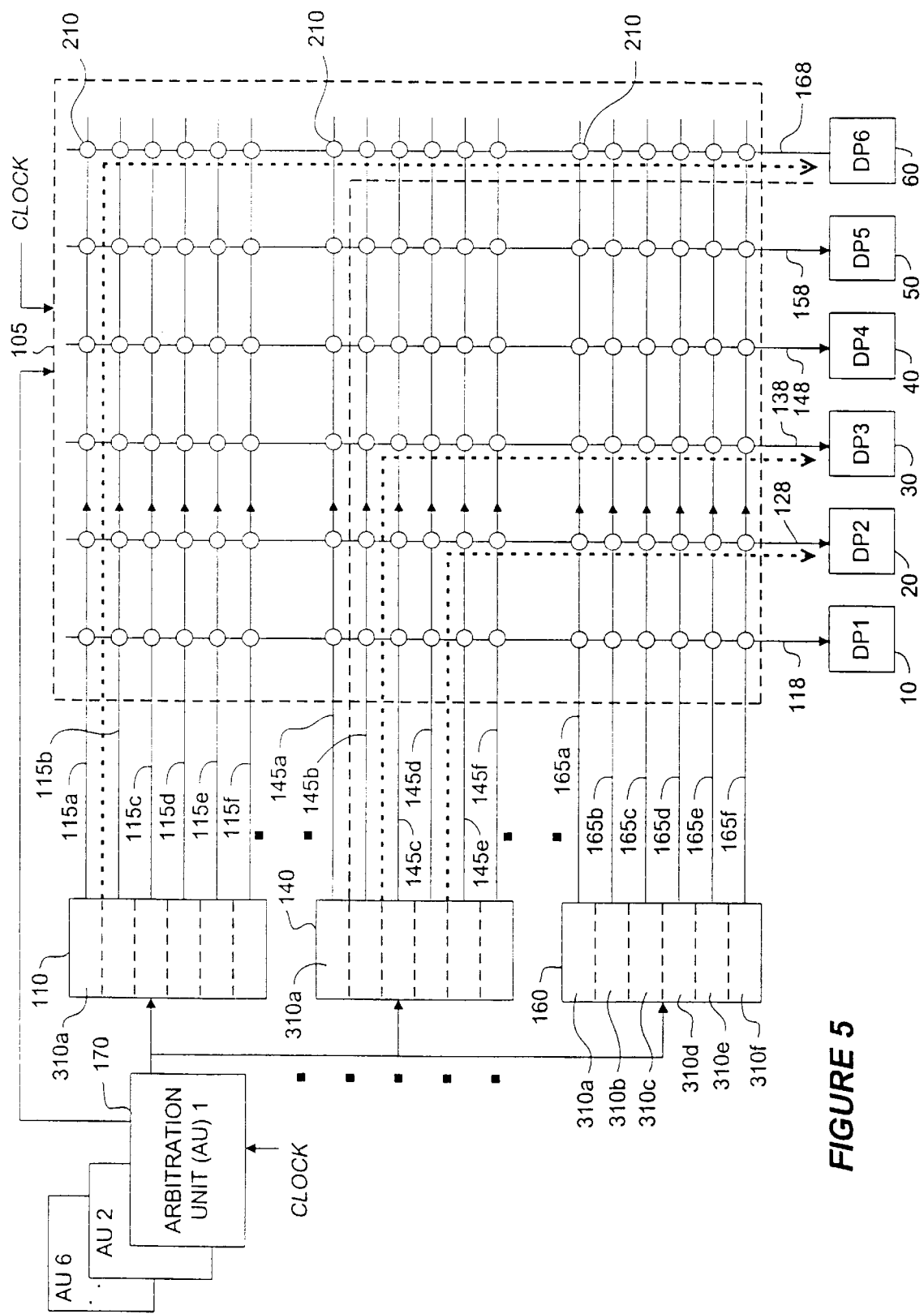
FIG. 5 is a block diagram illustrating one embodiment of an internal portion of the present invention where multiple source data ports attempt to transmit to at least one common destination data port.

Referring now to FIG. 5, a block diagram illustrates one embodiment of an internal portion of the present invention in which multiple source data ports attempt to transmit to at least one common destination data port. In this embodiment, the system includes a crossbar switch 105, destination data ports 10, 20, 30, 40, 50, 60, source data port input buffers 110, 120, 130, 140, 150, 160, data input paths 115a–f, 125a–f, 135a–f, 145a–f, 155a–f, 165a–f, data output paths 118, 128, 138, 148, 158, 168, and crosspoint circuits 210. Each crosspoint circuit 210 is coupled to the data input paths 115a–f, 125a–f, 135a–f, 145a–f, 155a–f, 165a–f and the data outputpaths 118, 128, 138, 148, 158, 168 at an intersection of each of the two paths. A set of flow lines (dashed lines along the data paths) illustrate one example of the flow and potential flow of data packets from a source data port input buffer to a destination data port, as is further discussed below.

For purposes of simplicity, consider a data packet from the source data port 1 being loaded and transmitted to the destination data port 6 60, similar to the process discussed above with respect to FIG. 4. Simultaneously, a data packet from the source data port 4 seeks to have data packets transmitted to the destination data port 2 20 through the data port 2 output path 128, to the destination data port 3 30 through the data port 3 output path 138, and to the destination data port 6 60 through the data port 6 output path 168. Thus, similar to the process discussed for the data packets in FIG. 4, the data packets from the source data port 4 are loaded into the data sections of the source data port 4 input buffer 140 along with a header that provides destination information indicating whether that particular data packet is to be transmitted to the destination data port 2 20, the destination data port 3 30, or the destination data port 6 60. The header also includes priority information indicating the relative priority of that data packet compared to other data packets.

To illustrate operation of this embodiment, consider that the data packet in the first data section of the source data port 4 input buffer 140 is high priority and destined for the destination data port 6 60. The data packet in the second data section is medium priority and destined for the destination data port 3 30. Finally, the data packet in the fourth data section is low priority and destined for the destination data port 2 20. The arbitration unit 170 associated with the destination data port 6 60 does not grant access to the destination data port 6 60 because the source data port 1 is currently transmitting to the destination data port 6 60. However, the arbitration units 170 associated with the destination data port 2 20 and the destination data port 3 30 find that these data ports are available to receive the data packets. The present invention transmits the data packets destined for the destination data port 2 20 and the data packets destined for the destination data port 3 30 from the respective data sections, despite these data packets having lower priority than the data packet in the first data section. The present invention can transmit the lower priority data packets destined for the destination data port 2 20 and the destination data port 3 30 when the higher priority data packet destined for the destination data port 6 60 is unable to transmit due to the current transmission to the destination data port 6 60 from the data port 1. The dedicated data input path 140a–f for each data section of the source data port 4 input buffer eliminates the requirement that lower priority data packets wait for higher priority data packets to transmit to the crossbar switch 105.

One embodiment of the present invention uses conventional arbitration, including conventional hardware, software, or a combination of hardware and software, to determine the availability of a particular data port or data ports. In another embodiment, the present invention may use an arbitration device and method as is disclosed in the above-referenced U.S. patent application, Ser. No. 08/603,880, titled "METHOD AND APPARATUS FOR COORDINATING ACCESS TO AN OUTPUT OF A ROUTING DEVICE IN A PACKET SWITCHING NETWORK", filed on Feb. 22, 1996, by Jeffrey D. Larson, Albert Mu, and Thomas M. Wicki.

This embodiment of the present invention illustrates a benefit of a dedicated data input path 115a–f, 125a–f, 135a–f, 145a–f, 155a–f, 165a–f from each data section of a data input buffer 110, 120, 130, 140, 150, 160 to each data output path 110, 120, 130, 140, 150, 160 within the crossbar switch 105. The presence of each dedicated data input path 115a–f, 125a–f, 135a–f, 145a–f, 155a–f, 165a–f eliminates the initial arbitration previously required to first access a data input path leading to the crossbar switch 105. The presence of each dedicated data input path 115a–f, 125a–f, 135a–f, 145a–f, 155a–f, 165a–f also eliminates internal blocking problems because transmission of lower priority data packets to the crossbar switch 105 are permitted despite the presence of higher priority data packets that are waiting to be transmitted from other data sections of a source data port input buffer. Therefore, because there is no internal blocking occurring the present invention provides an advantage of faster data transmission through the crossbar switch 105.

Figure 6:
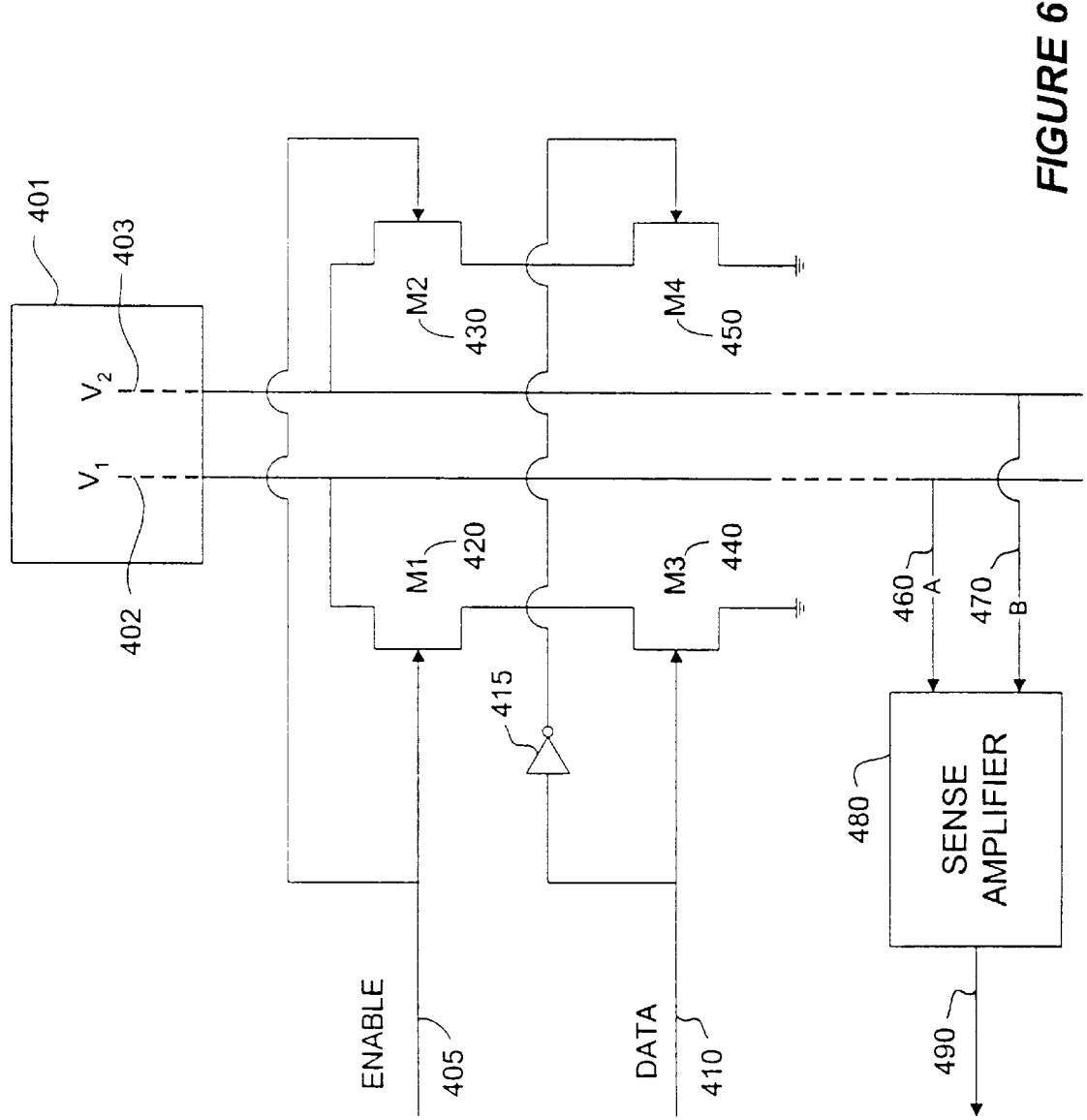
FIG. 6 is a block diagram illustrating one embodiment of a crosspoint circuit within a crossbar switch of the present invention.

Referring now to FIG. 6, a block diagram illustrates one embodiment of the crosspoint circuit 210 in the crossbar switch 105. The crosspoint circuit 210 is a differential, reduced voltage swing circuit structure. The swing for switching states is typically 500 millivolts ("mV") due to the possibly large differential mode noise from the crossing and the adjacent conductors. The circuit includes a precharge circuit 401, a reduced voltage swing line V1 402, and a reduced voltage swing line V2 403. For each data input path 115a–f, 125a–f, 135a–f, 145a–f, 155a–f 165a–f, the circuit includes a data line 410, an inverter 415, a set of field-effect transistors ("FETs"), such as FETs M1 420, M2 430, M3 440, M4 450, and an enable line 405, so that in one embodiment of the present invention there are thirty-six (36) sets of such components along each data output path 118, 128, 138, 148, 158, 168. In addition, for each data port 10, 20, 30, 40, 50, 60 the crosspoint circuit includes a connection to a sense amplifier 480, sense amplifier lines A 460 and B 470, and a sense amplifier output line 490, so that in one embodiment of the present invention there are six (6) sets of such components, one along each data outputpath 118, 128, 138, 148, 158, 168.

The precharge circuit 401 is coupled to the reduced voltage swing lines V1 402 and V2 403. Then, for each data input path 115a–f, 125a–f, 135a–f, 145a–f, 155a–f 165a–f, the enable line 405 is coupled to a gate of the FETs M1 420 and M2 430. In addition, the data line 410 is coupled to a gate of the FET M3 440, and to the inverter 415 that is coupled to a gate of the FET M4 450. For each data input path 115a–f, 125a–f, 135a–f, 145a–f, 155a–f 165a–f the data line 410 is coupled to the data input path. In an alternative embodiment, the data input path is the data line 410.

The FET M1 420 is coupled to the reduced voltage swing line V1 402 and the FET M2 is coupled to the reduced voltage swing line V2 403. The FETs M1 420 and M3 440 form a transistor circuit as do the FETs M2 430 and M4 450. Moreover, FETs M1 420 and M2 430 form a differential pair, as do FETs M3 440 and M4 450. Also, for each data output path 118, 128, 138, 148, 158, 168, the reduced voltage swing line V1 402 is coupled to the sense amplifier line A 460 while the reduced voltage swing line V2 403 is coupled to the sense amplifier line B 470. The sense amplifier lines A 460 and B 470 are coupled to the sense amplifier 480 which is coupled to the sense amplifier output line 490. The sense amplifier output line 490 is coupled to its respective data output path 118, 128, 138, 148, 158, 168. In an alternative embodiment, the data output path is the sense amplifier output line 490.

Figure 7A:
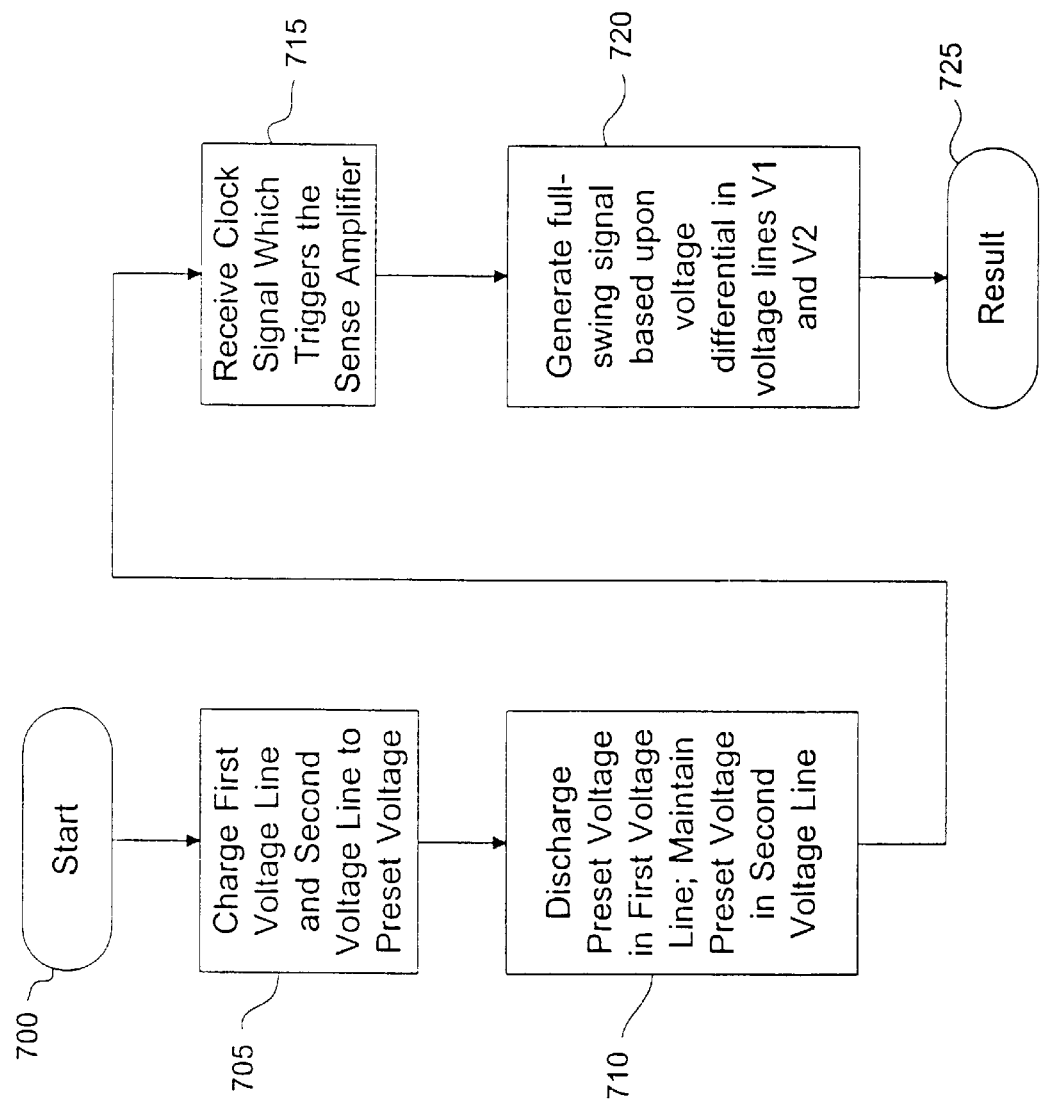
FIG. 7A is a flow diagram illustrating one method of general operation of a crosspoint circuit in the present invention.

FIG. 7A is a flow diagram illustrating the general operation of one embodiment of the crosspoint circuit 210. When the crosspoint circuit 210 begins 700 operation, a first reduced voltage swing line and a second reduced voltage swing line are charged 705 to a predetermined voltage level. Next, the predetermined voltage level in the first reduced voltage swing line is discharged 710 while the predetermined voltage level in the second reduced voltage swing line is maintained 710. Then, a clock signal is received 715 at the sense amplifier to turn it on, or place it in an on state. Based upon a voltage differential between the first reduced voltage swing line V1 402 and the second reduced voltage swing line V2 403, the sense amplifier triggers 720 an output signal that produces 725 a full-swing output that is ultimately sent to the destination data port.

Figure 7B:
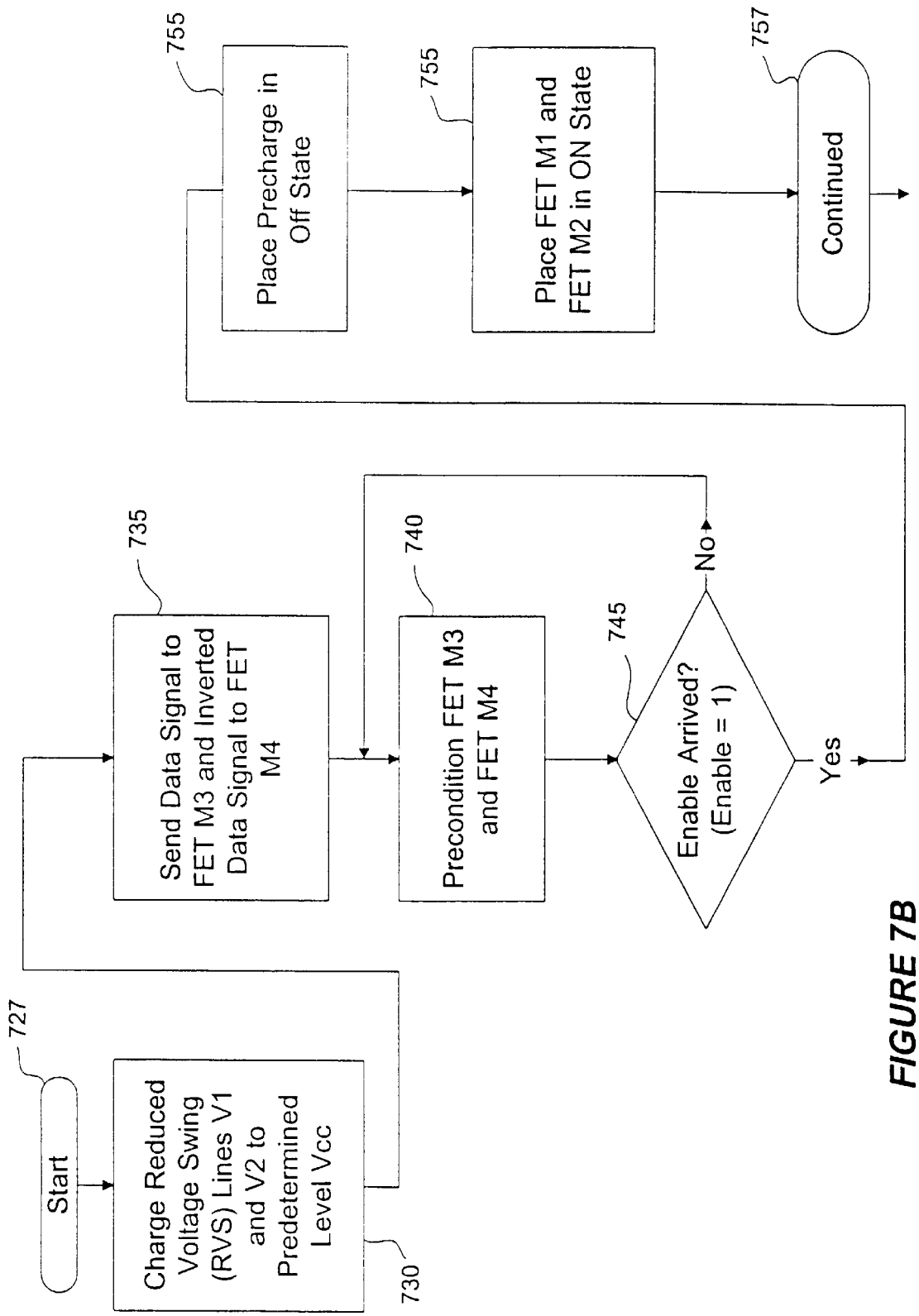
FIGS. 7B and 7C are a flow diagram illustrating another method of operation of a crosspoint circuit in the present invention.
Figure 7C:
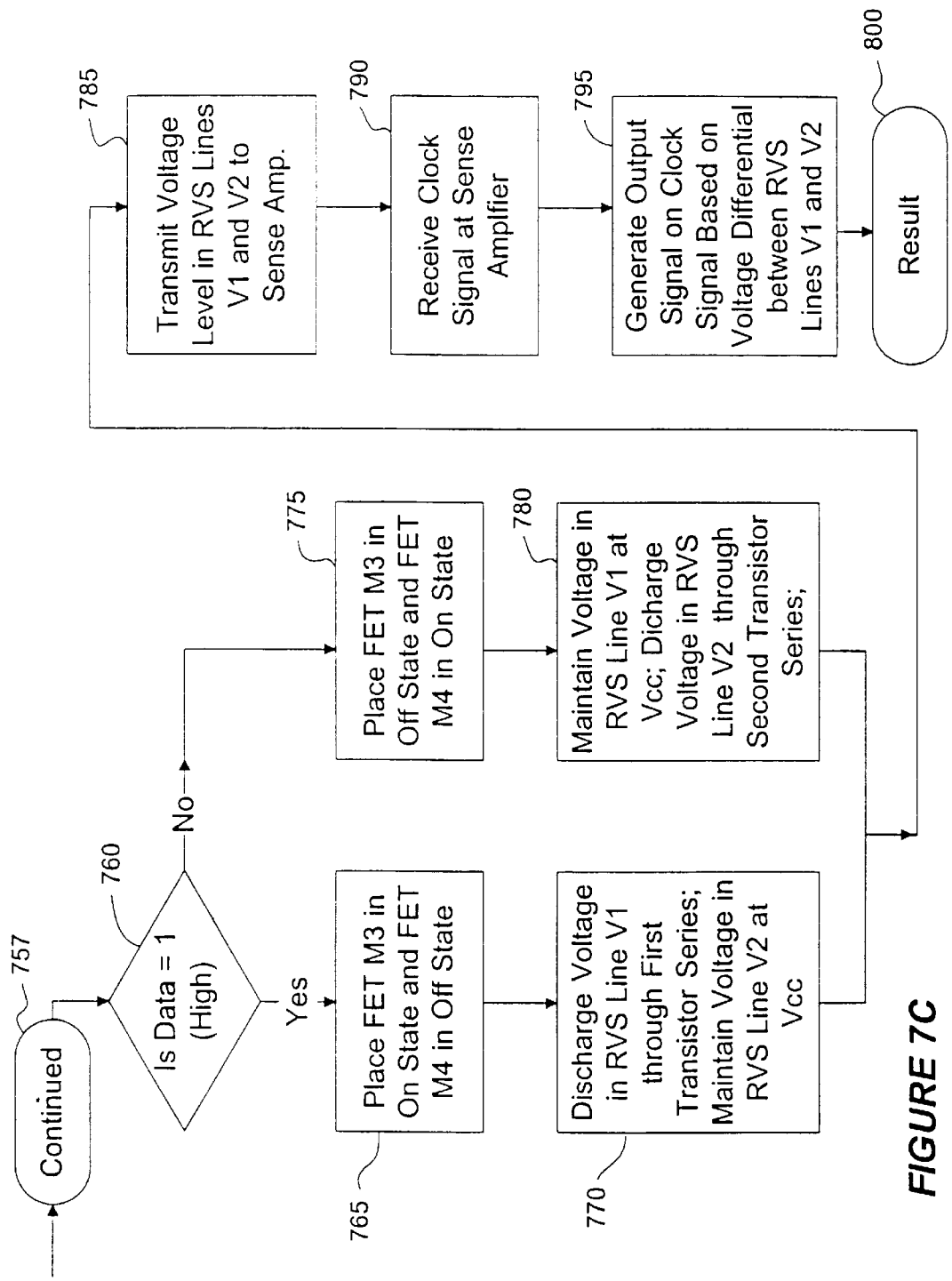

Referring now to FIGS. 7B and 7C, a flow diagram illustrates one embodiment of the operation of the crosspoint circuit 210 shown in FIG. 6. At a rising edge of a clock signal, when the system starts 727 a cycle for operation, the precharge circuit 401 turns on and an enable signal is inactive. The reduced voltage swing line V1 402 and the reduced voltage swing line V2 403 are charged 730 by the precharge circuit 401 so that both lines are charged to a predetermined voltage level such as Vcc volts of the power supply. As the reduced voltage swing lines V1 402 and V2 403 are being charged 730, a data signal is transmitted 735 along the data line 410 to the FET M3 440. The data signal is also inverted by inverter 415 and transmitted 735 to the FET M4 450. The data signal is loaded by preconditioning 740 the gates of both the FET M3 440 and the FET M4 450 so that the appropriate state of the data signal is reached. Next, the system checks whether the enable signal has arrived 745. If there is no enable signal, the system continues to precondition the FET M3 440 and the FET M4 450. When the enable signal (logic high=1) is present on the enable line 405, the precharge circuit 401 is placed 750 in an off state and the FET M1 420 and the FET M2 430 both are placed 755 in an on state. The enable signal is derived from the arbitration circuit 170 grant signal that is gated with a clock signal.

The system then determines 760 whether the data signal along data line 410 is a logic high, e.g., 1, at the time the enable signal arrives. If the data signal is high, the FET M1 420 and the FET M3 440 transistor circuit is placed 765 in an on state and the reduced voltage swing line V1 402 begins to discharge 770 to ground through this transistor circuit. Conversely, the FET M2 430 and the FET M4 450 transistor circuit is placed 770 in an off state because the inverted data line is a logic low, e.g., 0, thus turning off the FET M4 450. By placing the FET M2 430, FET M4 440 series in an off state, the voltage in the reduced voltage swing line V2 403 is maintained 770 at the Vcc level. The voltage level along the reduced voltage swing line V1 402 is transmitted 785 along sense amplifier line A 460 and the voltage level along the reduced voltage swing line V2 403 is transmitted 785 along sense amplifier line B 470, and the signals in both sense amplifier lines A 460 and B 470 are used to drive the sense amplifier 480. The sense amplifier 480 receives 790 a clock signal and turns on when the clock signal is high. When the sense amplifier 480 turns on, it generates 795 an output signal based on the voltage differential at that instant, that is at least 500 mV at an operating frequency of 200 megahertz ("Mhz"), between the reduced voltage swing line V1 402 and the reduced voltage swing line V2 403. The output signal that is produced 800 is a full-swing output of either 3.3 volts or ground (0 volts) depending upon the particular characteristics of the sense amplifier 480.

If the data signal is not high 760, but instead is low the FET M3 is placed 775 in an off state and the FET M4 450 is placed 775 in an on state so that the FET M1 420, FET M3 440 circuit is in an off state and the FET M2 430, FET M4 450 circuit is in an on state. With the FET M1 420, FET M3 440 circuit in the off state the voltage level in the reduced voltage swing line V1 402 is maintained 780 at Vcc volts. Concurrently, the voltage level in the reduced voltage swing line V2 is discharged 780 through the FET M2 430, FET M4 450 circuit that is in the on state. The voltage level in both the first reduced voltage swing line V1 402 and the second reduced voltage swing line V2 403 is transmitted 785 to the sense amplifier. The sense amplifier measures 790 the voltage differential between the voltage levels in the reduced voltage swing line V1 402 and the reduced voltage swing line V2 403. The sense amplifier 480 receives 790 a clock signal and turns on at the high clock signal. The sense amplifier 480 turns on and generates 795 an output signal based on the voltage differential at that instant between the voltage in the reduced voltage swing line V1 402 and the voltage in the reduced voltage swing line V2 403. The output signal that is produced 800 is a full-swing output of either 3.3 volts or ground (0 volts) depending upon the particular characteristics of the sense amplifier 480.

In one embodiment of the present invention, the sense amplifier 480 is a conventional sense amplifier. Alternatively, the sense amplifier 480 may be a sense amplifier as described in the above-referenced U.S. patent application, Ser. No. 08/603,882, titled "CLOCKED SENSE AMPLIFIER WITH POSITIVE SOURCE FEEDBACK", filed on Feb. 22, 1996, by Albert Mu. Also, the present invention permits the sense amplifier 480 to operate at a reduced voltage signal swing by generating a signal based upon the clock signal and the differential voltage rather than a full-swing voltage level. The system also produces a full-swing output signal by the sense amplifier 480 of either 3.3 volts or ground (0 volts) despite triggering or generating the output signal on a reduced swing differential. The full-swing signal is sent from the sense amplifier output line 490 to the data output path that is coupled to it.

The reduced voltage swing crosspoint circuit allows multiple data input paths to connect to a bus of a crossbar switch without overburdening the bus. One advantage of this implementation is an increase in system speed because multiple data packets can transmit to and from the data port simultaneously over the bus of the crossbar switch, thereby providing an approach to eliminate internal blocking. In addition, the crosspoint circuit 210 may use a reduced differential swing operation to switch from one state to another state with a sufficient voltage differential rather than having to attain a particular voltage level. This increases system speed because the system does not need to wait for a particular voltage level in the reduced voltage swing lines before switching a state. Another advantage of this design is reduced power dissipation because of a reduced voltage swing on the data bus so that the overall power consumption of the chip is reduced. Moreover, generating or triggering an output signal based on the differential voltage reduces on-chip power drops that could adversely affect the system operation.

Figure 8:
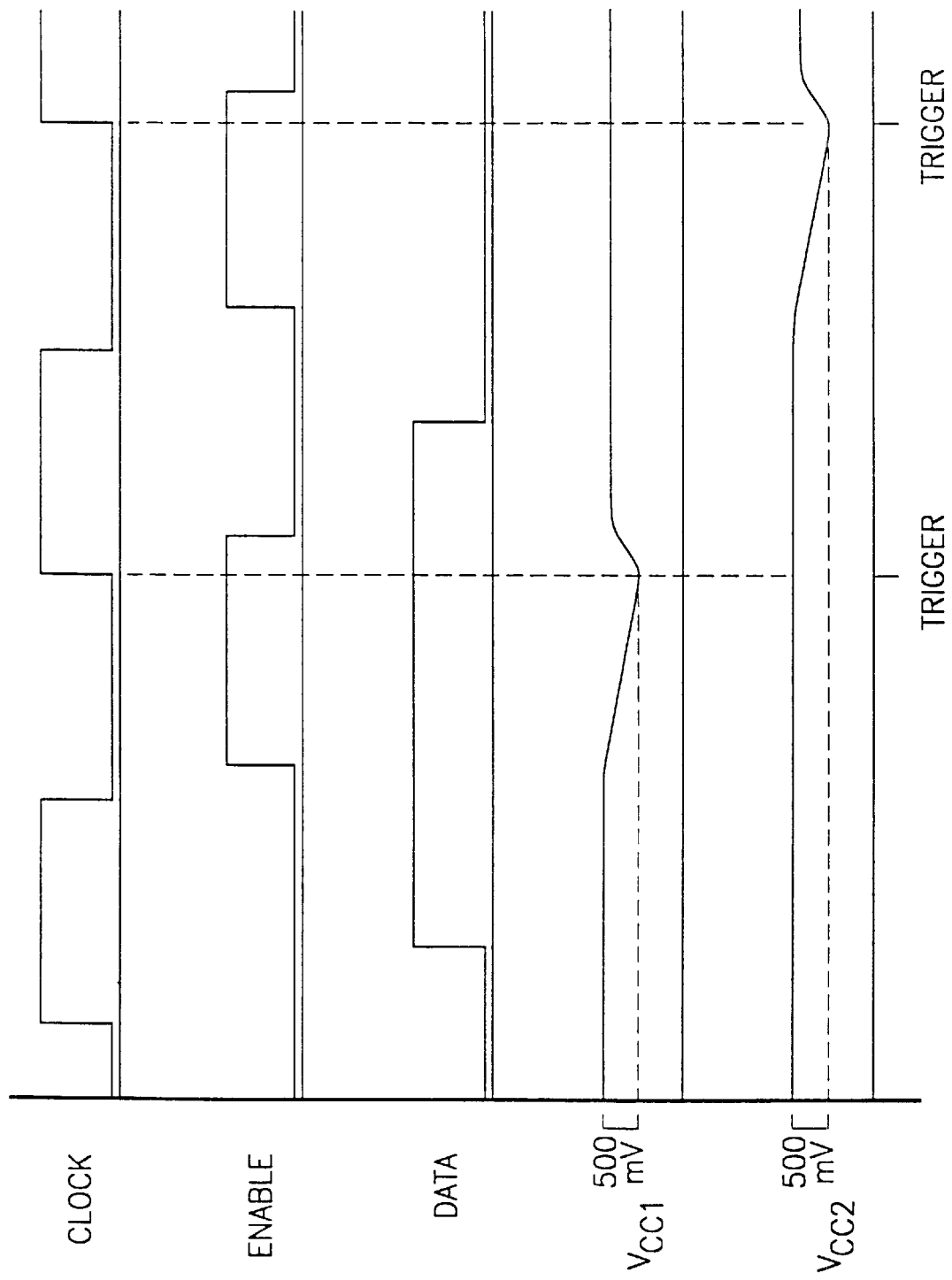
FIG. 8 is a graph of waveforms present during operation of one embodiment of the present invention.

FIG. 8 is a graph of waveforms present during operation of one embodiment of the present invention. The waveforms include a clock signal, an enable signal, a data signal, a Vcc1 signal, and a Vcc2 signal. At a rising edge of the clock signal, the enable signal is inactive and the precharge circuit 410 turns on so that the Vcc1 and the Vcc2 signal are at a voltage level of Vcc. The data signal into the system is at a high, or 1, state. When the enable signal becomes active, the precharge circuit turns off or goes to an off state. The Vcc1 signal begins to discharge toward ground through FETs M1 and M3 because the data signal is at the high state. The Vcc2 signal remains at the Vcc voltage level. On the rising edge of the clock signal, the sense amplifier turns on and generates or triggers an output signal based on the voltage differential between Vcc1 and Vcc2.

When another rising edge of the clock signal arrives, the precharge circuit turns on again or goes to an on state and the enable signal soon becomes inactive. The voltage signals Vcc1 and Vcc2 once again go to the voltage level of Vcc. During this time, the data signal may toggle to a low, or 0, state. When the enable signal again becomes active, the precharge circuit turns off. This time, the Vcc2 signal begins to discharge toward ground through FETs M2 and M4 because the data signal is at the low state. The Vcc1 signal remains at the Vcc voltage level. On the rising edge of the clock signal the sense amplifier is again triggered in response to the differential between Vcc1 and Vcc2.

Although the present invention has been described in a packet switching environment, the system and method of the present invention may apply to other switching environments, such as a circuit switching environment. In a circuit switching environment there is no buffering because there is no contention for the switch circuit.

What is claimed is:

1. A switching system for selectively transferring data packets and including a switch, an input buffer having a first data section and a second data section, and a destination data port, the system comprising:

a first dedicated input path coupled to the first data section and a second dedicated input path coupled to the second data section, the first dedicated input path and the second dedicated input path for transferring data packets from the first data section and the second data section, respectively, to the switch;

an output path coupled to the destination data port for transmitting the data packets to the destination data port; and a first reduced voltage swing crosspoint circuit, disposed in the switch, to couple the first dedicated input path and the output path, and a second reduced voltage swing crosspoint circuit, disposed in the switch, to couple the second dedicated input path and the output path, the first reduced voltage swing crosspoint circuit and the second reduced voltage swing crosspoint circuit for switching the data packets from the first dedicated input path and the second dedicated input path, respectively, to the output path, wherein each reduced voltage swing crosspoint circuit generates a differential signal, and includes a precharge circuit that is switchable to an off state prior to a discharging of the reduced voltage swing crosspoint circuit.

2. The switching system as in claim 1, wherein each reduced voltage swing crosspoint circuit further comprises a sense amplifier for producing a full-swing output signal, the sense amplifier having a differential input for receiving the differential signal generated by the reduced voltage swing crosspoint circuit.

3. The switching system as in claim 1, further comprising an arbitration unit for determining whether the destination data port is available to receive the data packet, the arbitration unit coupled to the switch.

4. The switching system as in claim 1, wherein the switching system further comprises switching circuit signals.

5. In a switching system for selectively transferring data packets and including a switch, a plurality of output paths, and an input buffer having a plurality of data sections, each data section coupled to a dedicated input path, a method for transferring data comprising the steps of:

loading a plurality of data packets into the plurality of data sections;

transferring each data packet to the switch over each dedicated input path coupled to each data section holding each data packet; and switching each data packet from each dedicated input path to an output path through a reduced voltage swing crosspoint circuit, wherein the reduced voltage swing crosspoint circuit generates a differential signal, and includes a precharge circuit that is switchable to an off state prior to a discharging of the reduced voltage swing crosspoint circuit.

6. The method as in claim 5, further comprising the step of coupling each dedicated input path to the switch.

7. The method as in claim 5, wherein the switching step further comprises the step of electrically coupling a dedicated input path and an output path.

8. The method as in claim 5, further comprising the step of determining whether a destination data port is available to receive a data packet.

* * * * *